Figure 2:
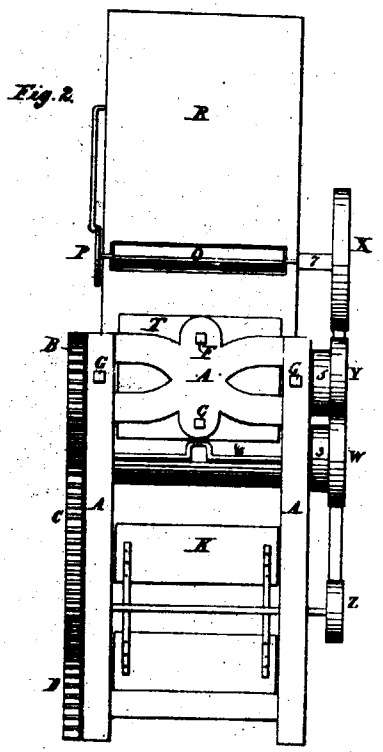
Figure 1:
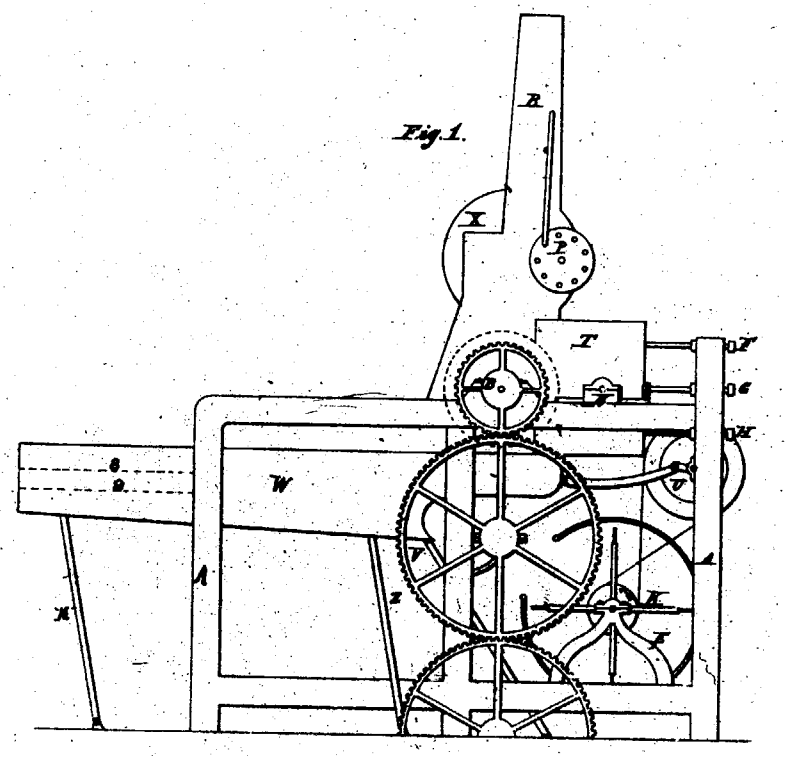

No Printed Specification Available

9200X

A. MILLER & T. LAWES.

MACHINE FOR HULLING COTTON SEED.

Patented Oct. 27, 1835.

Anderson Miller and Thos Lawes. Citizens of the United States

Letters } Improvement in the Machine for hulling
Patent } Cotton Seed.
No. 664 } Date of the Patent 27 Oct 1835 –
Certificate Atty Genl 31st Oct 1835 –

---

The Schedule referred to in these Letters Patent and making part of the same containing a description in the words of the said Anderson Miller & Thos Lawes themselves of their improvement in the machine for hulling Cotton seed.

To all to whom these Presents shall come
Be it known that we Anderson Miller of the County of Washington in the State of Mississippi and Thomas Laws of the County of Jefferson in the State of Kentucky have invented a new & useful improvement in the cotton seed Hulling Machine of Messrs. Follett & Smith of Petersburg in the State of Virginia and the following is a full and exact description of the construction and Operation of said machine as improved by us. Viz. For the purpose of a clear & definite description a drawing of the machine as improved by us is herewith annexed, the frame of the Hulling Mill is made of cast iron, the sides [are of two separate pieces cast solid and the [illegible] [illegible] connects them] together with bolts in a neat and substantial manner – All the journals run in brass boxes the Cog wheel on the hulling stone & slack wheel is made of cast iron, they are represented in brass on the model the slack wheel & [illegible] is for the purpose of throwing it out of gear at pleasure. The feed box which stands over the hulling stone is to extend up to the floor, above where the seed is let into the upper end of the box and falls to the revolving wheel in a box with iron teeth. The excentric roller parallel with the above wheel can be turned round which makes the space larger or smaller and regulates the feed, there is an index wheel on excentric roller, with a pin to hold it fast, when in the right position then the feed is regulated without any difficulty passes through between the stones

2.

9200X to the double riddles which rests on three rows and shaken by a crank. The seed passes down close by the fan & the husks is blown off Witness
John F Cooke
John L Porter Anderson Miller
Thos Lowes 360 acres (Drawing)